US007759639B2

(12) United States Patent
Schlaf et al.

(10) Patent No.: US 7,759,639 B2
(45) Date of Patent: Jul. 20, 2010

(54) ELECTROSPRAY DEPOSITING SYSTEM FOR BIOLOGICAL MATERIALS

(75) Inventors: Rudiger Schlaf, Tampa, FL (US); Daniel V. Lim, Tampa, FL (US); Marianne F. Brannon, Gray, TN (US); Anthony J. Cascio, Land O'Lakes, FL (US)

(73) Assignee: University of South Florida, Tampa, FL (US)

( * ) Notice: Subject to any disclaimer, the term of this patent is extended or adjusted under 35 U.S.C. 154(b) by 254 days.

(21) Appl. No.: 11/841,236

(22) Filed: Aug. 20, 2007

(65) Prior Publication Data

US 2008/0171152 A1 Jul. 17, 2008

Related U.S. Application Data

(63) Continuation of application No. PCT/US06/05587, filed on Feb. 17, 2006.

(60) Provisional application No. 60/654,735, filed on Feb. 18, 2005.

(51) Int. Cl.

| | |
|---|---|
| ***H01J 49/04*** | (2006.01) |
| ***H01J 49/26*** | (2006.01) |
| ***B01D 59/44*** | (2006.01) |
| ***B01J 19/08*** | (2006.01) |

(52) U.S. Cl. ....................... 250/288; 250/281; 250/282; 250/423 R

(58) Field of Classification Search ................. 250/288, 250/281, 282, 423 R See application file for complete search history.

(56) References Cited

U.S. PATENT DOCUMENTS

| | | | | |
|---|---|---|---|---|
| 6,627,882 | B2 * | 9/2003 | Schultz et al. | 250/288 |
| 7,122,640 | B2 * | 10/2006 | Gjerde et al. | 530/412 |
| 7,151,167 | B2 * | 12/2006 | Gjerde et al. | 530/412 |
| 2002/0000516 | A1 | 1/2002 | Schultz et al. | |
| 2002/0092822 | A1 | 7/2002 | Moon et al. | |
| 2003/0013203 | A1 | 1/2003 | Jedrzejewski et al. | |
| 2003/0049841 | A1 * | 3/2003 | Short et al. | 435/449 |
| 2003/0168591 | A1 | 9/2003 | Smith et al. | |

(Continued)

OTHER PUBLICATIONS

N. Dam, M.M. Beerbom, J.C. Braunagel and R. Schlaf: "Photoelectron Spectroscopic Investigation of In-Vacuum Prepared Luminescent Polymer Thin Films Directly From Solution", J. Appl. Phys. 97, Art.No: 024909 (2005).

(Continued)

*Primary Examiner*—Nikita Wells
(74) *Attorney, Agent, or Firm*—Michele L. Lawson; Smith & Hopen, P.A.

(57) ABSTRACT

An electrospray (ES)-based deposition system enabling the coating an impervious substrate, such as a glass slide, with biological materials in a vacuum. Distilled water or a buffer is used as the solvent; no other solvents are used thereby eliminating hazardous waste from the process. Movement across differential pumping stages causes evaporation of the solvent occurs resulting in shrinkage of the remaining constituents with an increase of the charge density. The resulting ion beam enters a vacuum chamber and the beam impinges on the substrate, whereby a thin layer is deposited thereon. The spray can be focused to a specific area allowing patterning of the substrate if desired. The amount of coating can be controlled and a specified number of coats of the same or different molecules can be added to the surface.

27 Claims, 3 Drawing Sheets

U.S. PATENT DOCUMENTS

| | | | |
|---|---|---|---|
| 2003/0201390 | A1 | 10/2003 | Corso et al. |
| 2003/0218127 | A1 | 11/2003 | Schlaf et al. |
| 2004/0045904 | A1 | 3/2004 | Zhang et al. |
| 2004/0182818 | A1 | 9/2004 | Moon et al. |
| 2005/0178959 | A1 | 8/2005 | Lopez-Avila et al. |
| 2005/0257515 | A1 | 11/2005 | Song |
| 2006/0071665 | A1 * | 4/2006 | Blake et al. ................. 324/464 |

OTHER PUBLICATIONS

Rowe-Taitt, C.A., L.M. Tender, M.J. Feldstein, J.P. Golden, S.B. Scruggs, B.D. Maccraith, J.J. Cras, and F.S. Ligler. 1999. Array biosensor for simultaneous identification of bacterial, viral, and protein analytes. Anal. Chem. 71:3846-3852.

Rowe-Taitt, C.A., J.P. Golden, M.J. Feldstein, J.J. Cras, K.E. Hoffman, and F.S. Ligler. 2000. Array biosensor for detection of biohazards. Biosens & Bioelectron. 14:785-794.

Rowe-Taitt, C.A., J.W. Hazzard, K.E. Hoffman, J.J. Cras, J.P. Golden, and F.S. Ligler. 2000. Simultaneous detection of six biohazardous agents using a planar waveguide array biosensor. Biosens. Bioelectron. 15:579-589.

* cited by examiner

ELECTROSPRAY DEPOSITING SYSTEM FOR BIOLOGICAL MATERIALS

CROSS REFERENCE TO RELATED APPLICATIONS

This application is a Continuation Application claiming the benefit of prior filed International Application, serial number PCT/US2006/005587, filed on Feb. 17, 2006, which claims a priority date of Feb. 18, 2005 based on prior filed U.S. Provisional Patent Application Ser. No. 60/654,735, which is fully incorporated herein by reference.

GOVERNMENT SUPPORT

This invention was developed under support from the U.S. Army Research, Development and Engineering Command (RDECOM) under grant DAAD13-00-C-0037; the U.S. government has certain rights in the invention.

BACKGROUND OF THE INVENTION

The present invention relates generally to the field of preparing a substrate for use in immunoassays. Specifically, the invention provides a method of directly coating biological materials on a glass surface.

A "sandwich" immunoassay measures an analyte that is bound between two antibodies; namely the capture antibody and the detection antibody. Sandwich immunoassays are utilized as a tool to specifically identify and/or detect analytes such as bacteria, fungi, viruses, and protozoa in samples. Capture molecules, such as antibodies, bind to the target cells and capture them while other debris and non-target cells in the sample are washed away.

In assays that require capture molecule attachment to an impervious substrate such as a glass slide, the glass surface must be coated with silane. A cross-linker molecule is used to cross-link the silane to the capture molecule. The chemistry involved in the silanization and cross-linking process is tedious and must be performed in the absence of oxygen using toluene, which is flammable, as the solvent. The toluene/silane contaminated reagents must then be discarded as hazardous waste.

Electrospray Ionization (ESI) involves injecting and focusing a charged stream of particles held in solution into a vacuum environment. The electrospray (ES) process allows for the deposition of a film of the desired particles onto a substrate. In the ESI process, the solute molecules are directed toward the substrate based not only on their kinetic energy, but based on their movement through a pressure differential. This differential is established such that the stream of solute molecules will move toward the target chamber, which is held at a lower pressure than at the point of injection. To achieve this pressure difference, differential pumping stages are used. One example of the equipment used to accomplish this consists of two rotary vane pumps, one on each side of an orifice. The orifice size and pumping speeds are be balanced to achieve a good transmission rate of solute molecules, while preserving the pressure differential necessary to guide the solute to the target.

SUMMARY OF INVENTION

The present invention includes an electrospray-based process using in-vacuum deposition of the constituents of a sandwich immunoassay. In this process, solutions containing the constituents as solute are injected into vacuum through an orifice in the vacuum chamber. As the injected beam passes through consecutive vacuum stages, the solvent is extracted and a molecular beam containing only the solute remains. This beam is directed towards the substrate and a film is deposited.

In a first embodiment the present invention provides a method of preparing a substrate for use in an assay. In the first step, a substrate solution comprising a capture molecule is prepared. The substrate solution is then converted to an electrospray as it passes through consecutive vacuum stages. The electrospray is then deposited on the substrate. In alternate embodiments the substrate solution further comprises a solvent, such as distilled water or a buffer.

The converting step may take many forms, but by way of example, further comprises the steps of providing a differential pumping mechanism having an entry portal, a plurality of differential pumping chambers and a vacuum chamber, wherein the substrate is placed. A capillary is placed in fluid communication with the entry portal. The substrate solution is then passed through the capillary toward the entry portal where it then continues the plurality of differential chambers into the vacuum chamber.

Many variations of this embodiment are envisioned. For example, the capillary may be spaced apart from the entry portal, defining an area there between. The solution is ionized as it exits the capillary in embodiments where the capillary is held at a higher voltage relative to entry portal. The area between the capillary and entry portal can also be flooded with $N_2$, creating a plenum to prevent the intrusion of contaminants.

In a second embodiment, the present invention includes a method of capturing an analyte present in a sample. A substrate having at least one analyte-specific capture molecule thereon is placed in a vacuum chamber. An analyte solution is then prepared comprising the sample. As with the previous embodiment, the analyte solution is converted to an electrospray and deposited on the substrate.

In a variation of the second embodiment, the analyte solution further comprises a solvent; such as distilled water or a buffer. Moreover, the analyte solution may further comprise a detection molecule capable of conjugating to the analyte.

The previous embodiments can be combined in succession to form yet another embodiment. In this third embodiment the invention provides a method of capturing an analyte, present in a sample, on a substrate. In this embodiment substrate solution comprising an analyte-specific capture molecule is prepared and converting into an electrospray. The substrate-electrospray is then deposited on the substrate. The analyte solution is then prepared. As before, the analyte solution is converted into an electrospray and deposited on the substrate in a vacuum.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes an electrospray (ES)-based deposition system enabling the coating an impervious substrate, such as a glass slide, in a vacuum. The ES process directly introduces macromolecules from solution into high vacuum. This has led to recent applications in mass spectroscopy of heavy molecules and is now routinely used in commercially available mass spectroscopy setups. ES has also been used for thin-film deposition and the fabrication of microassays at ambient pressure for a variety of macromolecular materials including DNA, proteins, polymers, and other materials. See Dam, et al. *Photoelectron spectroscopic Investigation of In-Vacuum-Prepared Luminescent Polymer Thin Films Directly from Solution*, Journal of Applied Physics 97, 024909 (2005), which is incorporated herein by reference, for a discussion of the deposition of macromolecular materials in vacuum.

ES, however, has not been used to prepare substrates under high-vacuum conditions for traditional sandwich assays. The ability to deposit constituents in a vacuum provides great benefit for ELISA assaying techniques, including, but are not limited to, no hazardous waste is generated, such as silane contaminated toluene, and reduced preparation time. Furthermore, the technique enables patterning and mass selection of the deposited material, i.e. complex molecular structures can be deposited without contamination or intersolubility issues (since the solvent is extracted before the molecules are deposited on the substrate).

In one embodiment, the solvent used is distilled water or a buffer. No hazardous waste remains after the process since no other solvent is used. The spray can be focused to a specific area of the substrate allowing patterning of the surface if so desired. The amount of coating is controlled and a specified number of coats of the same or different molecules can be added to the substrate.

Figure 1:
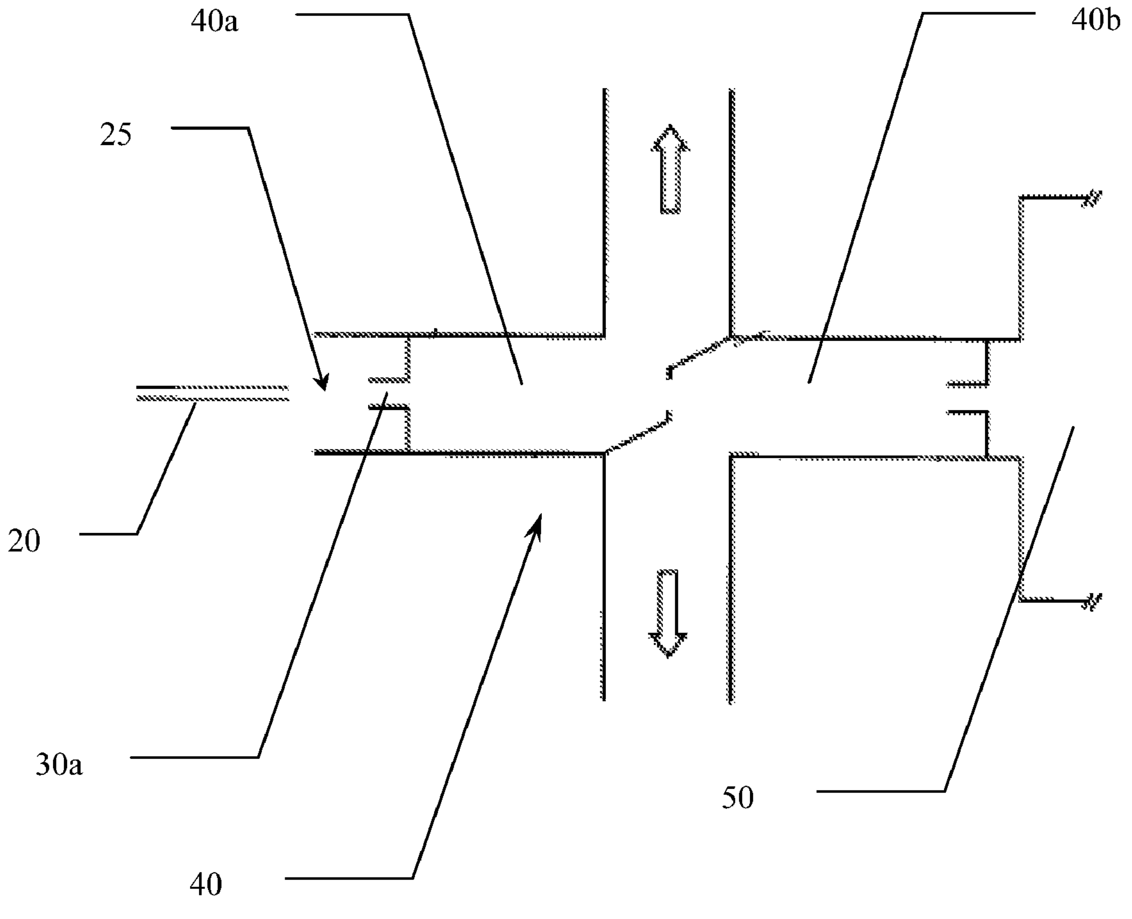
FIG. 1 is a schematic of one possible electrospray (ES) deposition system that can be used in performing the inventive method.

In another embodiment of the instant invention, shown in FIG. 1, a constituent solution is ejected from capillary 20 in front of a first skimmer orifice 30*a* at a predetermined distance, here about 10 mm. In alternate embodiments capillary 20 is held at a high voltage, e.g. s1-5 kVd, relative to first skimmer 30*a*. The differential in voltage results in the ionization of the sprayed constituent solution. Area 25 between capillary 20 and first skimmer 30*a* is flooded with N2 at slight overpressure (relative to atmosphere) to prevent entry of ambient contaminants into first differential pumping stage 40*a*. Once the solution spray enters differential pumping stages 40, rapid evaporation of the solvent occurs resulting in a shrinkage of the remaining constituents, with an increase of the charge density further helping the separation between solute and solvent molecules. Once the resulting ion beam enters main vacuum chamber 50, most of the solvent molecules have been captured in the differential pumping stages and a relatively clean beam of solute molecules results. This beam impinges on the substrate, and a thin layer is deposited thereon.

The fabrication of immunoassays using ES based thin film deposition in vacuum is, at first glance, counterintuitive. Protein molecules are generally thought to depend on a hydration shell to retain their shape. Conventional wisdom dictates that dehydration occurring during the deposition process in vacuum would result in denaturing of the molecules preventing the fabrication of a functional immunoassay. Surprisingly, the unexpected findings of the present invention demonstrate that denaturing does not occur and that fully functional immunoassays are produced with ES deposition in vacuum.

Figure 2:
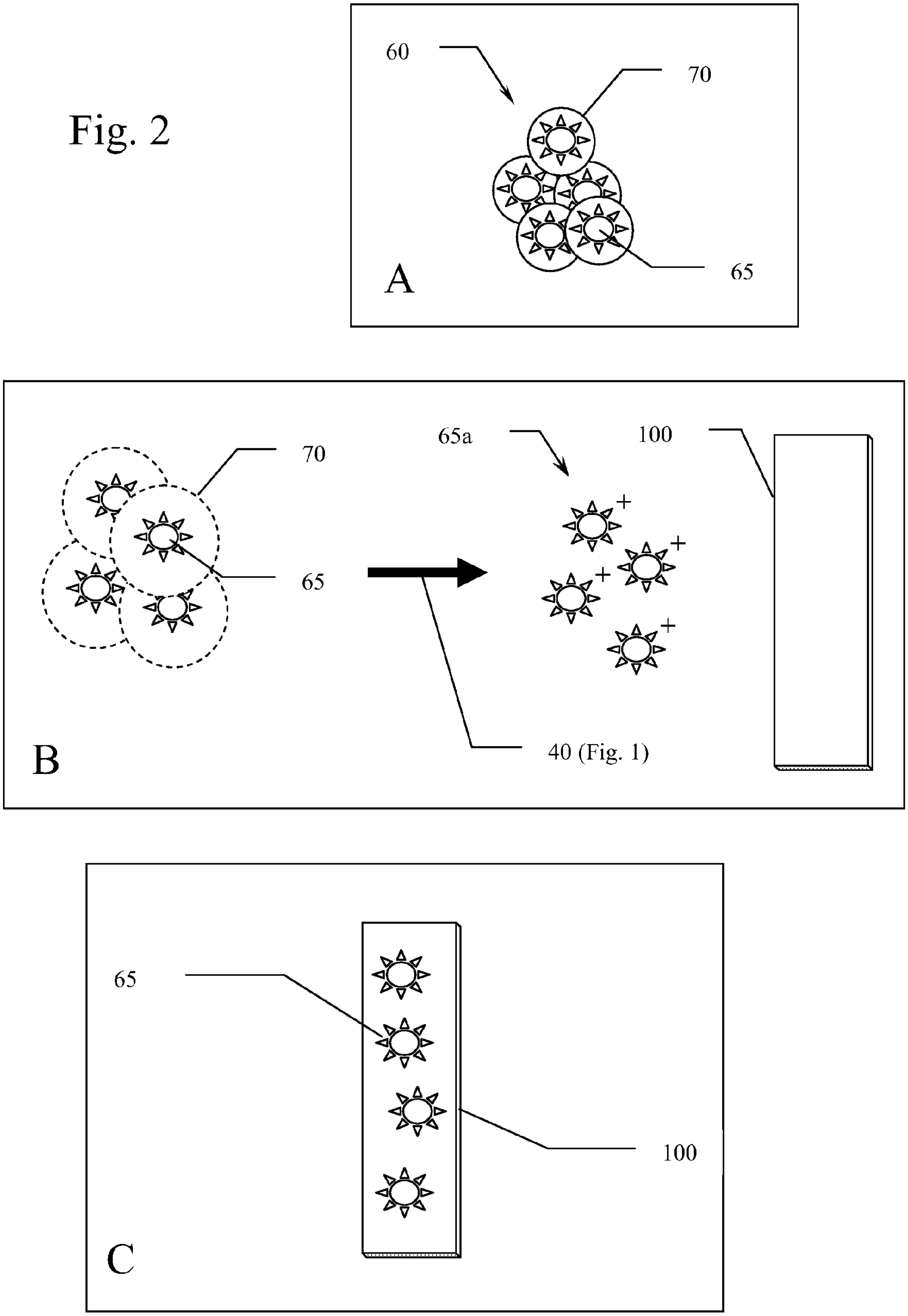
FIG. 2 is a block diagram of the preparation step.
Figure 3:
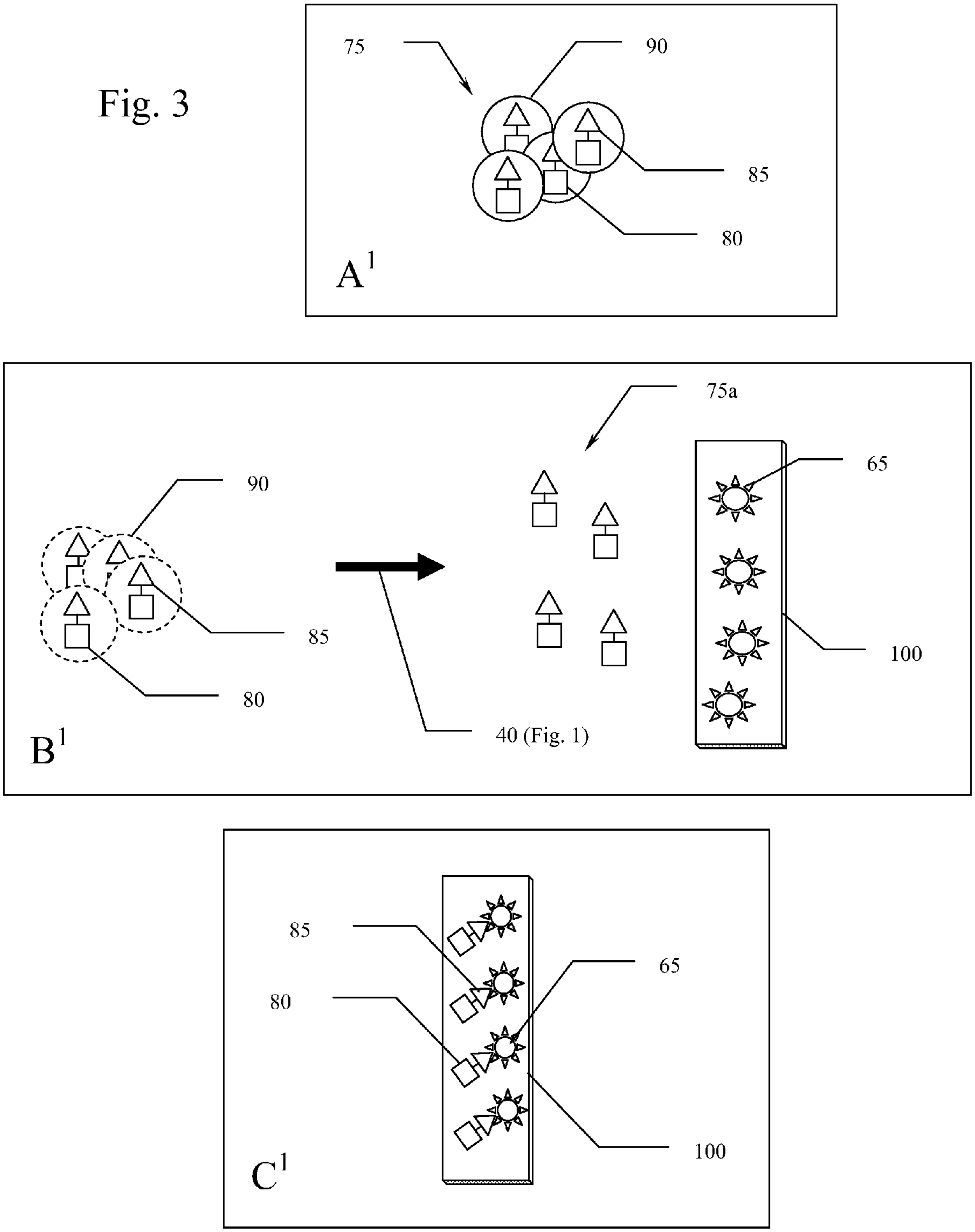
FIG. 3 is a block diagram of the capturing step.

An illustrative embodiment is shown FIGS. 2 and 3. FIG. 2 illustrates the preparation step, wherein the capture molecules adhere to the surface of the substrate and maintain their biological activity. In frame A, Substrate solution 60 is prepared comprising capture molecule 65 and solvent 70. In this illustrative embodiment capture molecule 65 is Streptavidin, (1 mg), suspended in 10 ml distilled water (solvent 70). As substrate solution 60 passes differential pumping stages 40 (see FIG. 1), frame B, solvent 70 begins rapid evaporation resulting in a shrinkage of the remaining constituents, namely capture molecule 65. This process leads to an increase of the charge density further helping the separation between solute and solvent molecules. Most solvent molecules have are captured in the differential pumping stages and a relatively clean beam 65*a* of solute (capture) molecules 65 results. Solute beam 65*a* impinges on substrate 100 and a thin layer is deposited thereon (frame C).

FIG. 3 illustrates the capturing step. Analyte solution 75, frame $A^1$, is prepared comprising detection molecule 80, the analyte to be assayed 85 and solvent 90. Here, detection molecule 80 is Biotin which is conjugated to analyte 85 *E. coli* O157:H7 antibody (1 mg). These constituents are suspended in solvent 90, in this example 10 ml distilled water. In frame $B^1$, as with the preparation step, solvent 90 begins to evaporate creating analyte beam 75*a*. Analyte solution 70 passes through the ES device (FIG. 1) in the same manner as substrate solution 60. When resulting analyte beam 75*a* enters main vacuum 50 (FIG. 1), analyte 85 binds to its specific target; capture molecule 65 (frame $C^1$).

Both solutes are deposited using the ES method in vacuum. In the inventor's experiments a control slide was prepared in the traditional manner, discussed above, and consisted of a silanized slide cross-linked to streptavidin (100 μg/ml) and patterned using a silicon stamp with biotin labeled anti-*E. coli* O157:H7 antibody at 20 μg/ml.

Slides were prepared following the embodiment shown in FIGS. 2 & 3 as discussed and used in an immunoassay. *E. coli* O157:H7 cells suspended in phosphate buffered saline (PBS) were added to the slide by flowing a sample of cells over the slide and incubating for 10-15 minutes at 24° C. The slides were washed with PBS. A solution containing Cyanine 5 (Cy5) labeled anti *E. coli* O157:H7 antibody (10 μg/ml) was allowed to flow over the slide in channels and incubated for 5-10 minutes. The slide was washed with PBS, and then all PBS was pumped away. The slide was viewed by directing a 635 nm laser diode to the edge of the slide to excite the Cy5 molecules. A CCD camera was used to view the emission from the Cy5 molecules as described by Rowe et al. (1999) Rowe-Taitt, Golden et al. (2000), and Rowe-Taitt, Hazzard et al. (2000).

Photoemission spectroscopy measurements revealed that the layer thickness of the immunoassay sandwich was about 4-10 Å, corresponding to approximately mono-molecular layer thickness.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of coating a substrate for use in an assay, comprising the steps of:

providing an impervious substrate;

providing a substrate solution comprising a capture molecule;

providing a differential pumping mechanism having an entry portal, a plurality of differential pumping chambers and a vacuum chamber positioned adjacent to and in fluid communication with the differential pumping chambers;

converting the substrate solution into an electrospray; and depositing the electrospray containing the capture molecule on the substrate in a vacuum.

2. The method of claim 1 wherein the substrate solution further comprises a solvent.

3. The method of claim 2 wherein the solvent is distilled water.

4. The method of claim 1 wherein the converting step further comprises the steps of:

providing a capillary in fluid communication with the entry portal;

passing the substrate solution through the capillary toward the entry portal; and passing the substrate solution through the plurality of differential chambers into the vacuum chamber and onto the impervious substrate positioned within the vacuum chamber.

5. The method of claim 4 wherein the capillary is spaced apart from the entry portal, defining an area therebetween.

6. The method of claim 4 wherein the capillary is held at a higher voltage relative to entry portal.

7. The method of claim 4 wherein the area between the capillary and entry portal is flooded with $N_2$.

8. The method of claim 1 wherein the substrate is a glass slide.

9. A method of capturing an analyte present in a sample, comprising the steps of:

providing an impervious substrate having at least one analyte-specific capture molecule thereon;

providing an analyte solution comprising the sample;

providing a differential pumping mechanism having an entry portal, a plurality of differential pumping chambers and a vacuum chamber positioned adjacent to and in fluid communication with the differential pumping chambers;

converting the analyte solution into an electrospray; and depositing the electrospray containing the analyte on top of the capture molecule contained on the substrate in a vacuum.

10. The method of claim 9 wherein the analyte solution further comprises a solvent.

11. The method of claim 10 wherein the solvent is distilled water.

12. The method of claim 9 wherein the analyte solution further comprises a detection molecule capable of conjugating to the analyte.

13. The method of claim 9 wherein the converting step further comprises the steps of:

providing a capillary in fluid communication with the entry portal;

passing the substrate solution through the capillary toward the entry portal; and passing the substrate solution through the plurality of differential chambers into the vacuum chamber and onto the impervious substrate positioned within the vacuum chamber.

14. The method of claim 13 wherein the capillary is spaced apart from the entry portal, defining an area therebetween.

15. The method of claim 13 wherein the capillary is held at a higher voltage relative to entry portal.

16. The method of claim 13 wherein the area between the capillary and entry portal is flooded with $N_2$.

17. The method of claim 9 wherein the substrate is a glass slide.

18. A method of capturing an analyte, present in a sample, on a substrate for use in a sandwich assay comprising the steps of:

providing an impervious substrate;

providing a substrate solution comprising an analyte-specific capture molecule;

converting the substrate solution into an electrospray;

depositing the substrate-solution electrospray containing the capture molecule on the substrate in a vacuum;

providing an analyte solution comprising the sample;

converting the analyte solution into an electrospray; and depositing the analyte-solution electrospray containing the analyte on top of the electrospray containing the capture molecule contained on the substrate in a vacuum.

19. The method of claim 18 wherein the substrate solution further comprises a solvent.

20. The method of claim 19 wherein the solvent is distilled water.

21. The method of claim 18 wherein the analyte solution further comprises a solvent.

22. The method of claim 21 wherein the solvent is distilled water.

23. The method of claim 18 wherein the converting steps further comprise the steps of:

providing a differential pumping mechanism having an entry portal, a plurality of differential pumping chambers and a vacuum chamber positioned adjacent to and in fluid communication with the differential pumping chambers;

providing a capillary in fluid communication with the entry portal;

passing the substrate solution through the capillary toward the entry portal; and passing the substrate solution through the plurality of differential chambers into the vacuum chamber and onto the impervious substrate positioned within the vacuum chamber.

24. The method of claim 23 wherein the capillary is spaced apart from the entry portal, defining an area there between.

25. The method of claim 23 wherein the capillary is held at a higher voltage relative to entry portal.

26. The method of claim 23 wherein the area between the capillary and entry portal is flooded with $N_2$.

27. The method of claim 18 wherein the substrate is a glass slide.

* * * * *